United States Patent
Jerbi

(10) Patent No.: US 11,212,323 B2
(45) Date of Patent: Dec. 28, 2021

(54) INFINITY REGISTRATION USING SESSION INITIATION PROTOCOL-BASED COMMUNICATION IN A SESSION INITIATION PROTOCOL-BASED NETWORK

(71) Applicant: Deutsche Telekom AG, Bonn (DE)

(72) Inventor: Walid Jerbi, Koenigswinter (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/919,204

(22) Filed: Jul. 2, 2020

(65) Prior Publication Data

US 2021/0006602 A1 Jan. 7, 2021

(30) Foreign Application Priority Data

Jul. 4, 2019 (EP) .................................... 19184398

(51) Int. Cl.
*H04L 29/06* (2006.01)
*H04W 76/18* (2018.01)
*H04L 29/08* (2006.01)
*H04W 8/24* (2009.01)
*H04W 60/02* (2009.01)

(52) U.S. Cl.
CPC ........ *H04L 65/1006* (2013.01); *H04L 67/147* (2013.01); *H04L 69/161* (2013.01); *H04W 8/24* (2013.01); *H04W 60/02* (2013.01); *H04W 76/18* (2018.02)

(58) Field of Classification Search
CPC . H04L 65/1006; H04L 67/147; H04L 69/161; H04W 76/18; H04W 8/24; H04W 60/02
See application file for complete search history.

(56) References Cited

U.S. PATENT DOCUMENTS

| | | | | |
|---|---|---|---|---|
| 6,421,674 B1 * | 7/2002 | Yoakum | ............ | H04L 29/06027 |
| 7,882,207 B1 * | 2/2011 | Titmuss | ................ | H04W 8/082 |
| | | | | 709/223 |
| 8,244,244 B1 * | 8/2012 | Hietalahti | ............. | H04W 60/02 |
| | | | | 455/435.1 |
| 8,495,186 B1 * | 7/2013 | Breau | ..................... | H04L 69/28 |
| | | | | 709/222 |
| 8,635,271 B1 * | 1/2014 | Adya | .................... | H04L 67/148 |
| | | | | 709/203 |
| 9,178,979 B1 * | 11/2015 | Khalil | ................... | H04W 60/06 |
| 10,523,720 B2 * | 12/2019 | Hallenstal | ........... | H04L 65/1006 |
| 2003/0236860 A1 * | 12/2003 | Yegin | ..................... | H04W 4/02 |
| | | | | 709/218 |

(Continued)

*Primary Examiner* — Jenee Holland
(74) *Attorney, Agent, or Firm* — Leydig, Voit & Mayer, Ltd.

(57) ABSTRACT

A Session Initiation Protocol (SIP)-based network includes at least two SIP user agents, wherein each SIP user agent is configured to act as a user agent client (UAC) for requesting a service function and as a user agent server (UAS) for responding to a request service function. The UAC is configured to initiate a registration with the UAS, wherein the registration comprises a field for indicating infinity registration capability and a field for indicating management communication capability. The UAS is configured to send to the UAC, a registration expiry timer with a value equal to infinity and a management header including a onetime unique token.

9 Claims, 4 Drawing Sheets

(56) References Cited

U.S. PATENT DOCUMENTS

| | | | |
|---|---|---|---|
| 2004/0153667 A1* | 8/2004 | Kastelewicz | H04W 12/06 |
| | | | 726/9 |
| 2005/0058068 A1* | 3/2005 | Ben Ali | H04L 47/70 |
| | | | 370/230 |
| 2005/0239498 A1 | 10/2005 | Dorenbosch et al. | |
| 2006/0149847 A1 | 7/2006 | Mayer et al. | |
| 2007/0011342 A1* | 1/2007 | Rosenberg | H04L 65/1006 |
| | | | 709/230 |
| 2009/0041034 A1* | 2/2009 | Boucadair | H04L 65/1069 |
| | | | 370/400 |
| 2009/0276532 A1* | 11/2009 | Bishop | H04L 67/145 |
| | | | 709/228 |
| 2010/0054257 A1* | 3/2010 | Dolganow | H04L 65/1083 |
| | | | 370/395.21 |
| 2010/0142711 A1* | 6/2010 | Weis | H04L 9/0833 |
| | | | 380/277 |
| 2011/0302646 A1* | 12/2011 | Ronda | H04L 63/0853 |
| | | | 726/9 |
| 2013/0265990 A1* | 10/2013 | Lee | H04W 60/00 |
| | | | 370/336 |
| 2016/0036864 A1* | 2/2016 | Ezell | H04M 7/0018 |
| | | | 709/227 |
| 2017/0093998 A1* | 3/2017 | McKay | H04L 67/26 |

* cited by examiner

INFINITY REGISTRATION USING SESSION INITIATION PROTOCOL-BASED COMMUNICATION IN A SESSION INITIATION PROTOCOL-BASED NETWORK

CROSS-REFERENCE TO PRIOR APPLICATION

Priority is claimed to European Patent Application No. EP19184398.6, filed on Jul. 4, 2019, the entire disclosure of which is hereby incorporated by reference herein.

FIELD

The invention relates to a method for infinity registration using Session Initiation Protocol (SIP) based communication in a Session Initiation Protocol based network.

BACKGROUND

There are many applications of the Internet that require the creation and management of a session, where a session is considered an exchange of data between an association of participants. The registration process is a fundamental part of the Session Initiation Protocol (SIP) as defined in the standard RFC 3261 (tools.ietf.org/html/rfc3261). This protocol is the well-established standard in Internet Protocol (IP) Multimedia Telephony and is used not only in 3GPP IMS (IP Multimedia Subsystem) networks but also in Legacy Voice over IP networks or in enterprise networks.

In general, network components that work with the Session Initiation Protocol for communication are referred to as SIP user agents. On the one hand, a user agent (UA) acts a user agent client (UAC) when it requests a service function. On the other hand, a UA acts as a user agent server (UAS) when it responds to a request.

A User Agent Client (UAC) is a Session Initiation Protocol (SIP) or Voice over IP (VoIP) application that works as a communication gateway and generates distributed network service requests.

The UAC refreshes the contact with the UAS periodically based on an expiry time signaled by the User-Agent-Server (UAS). In more detail, the UAC sends a register message before the timer expires. This process is referred to as a re-register. Otherwise, if the expiry timer expires, the UAC is considered not registered and is deleted from the registered users' database.

In IP Multimedia Subsystem or IP Multimedia Core Network Subsystem (IMS) networks much more logical functional nodes are involved. An example of an IMS network is shown in FIG. 1 which is reproduced from the 3GPP technical specification TS 23.228 v16.1.0, page 78. Pages 77 to 79 from the 3GPP technical specification TS 23.228 v16.1.0 are incorporated by reference herein in their entirety.

However, in these known networks, there is a problem with regard to the periodicity of this procedure. In more detail, the signaling amount involved in this procedure can be very high depending on the re-registration interval, i.e. the periodicity where the UAC sends registration traffic (re-registration). Further, several timers must start here and there to keep the registration alive. This also means that the UAC and the UAS need to keep their respective timers in synchronization. Besides, other application servers in the network who are informed by the registration might also start the timers.

In some operator networks this traffic sums up to an 80% of the whole SIP traffic.

SUMMARY

In an exemplary embodiment, the present invention provides a Session Initiation Protocol (SIP)-based network. The SIP-based network includes at least two SIP user agents, wherein each SIP user agent is configured to act as a user agent client (UAC) for requesting a service function and as a user agent server (UAS) for responding to a request service function. The UAC is configured to initiate a registration with the UAS, wherein the registration comprises a field for indicating infinity registration capability and a field for indicating management communication capability. The UAS is configured to send to the UAC, a registration expiry timer with a value equal to infinity and a management header including a onetime unique token. The UAC is configured to store, at the UAC, the onetime unique token in combination with the registered UAC. The UAS and UAC are configured to detect whether loss of a connection between the UAS and the UAC has occurred. The UAC is configured to initiate, based on a loss of the connection being detected by the UAC, a new registration without any indication from the UAS. The UAS is configured to send, based on a loss of the connection being detected by the UAS, to the UAC, an SIP message asking the UAC to initiate a new registration. The UAS is configured to send, to the UAC, the onetime unique token to refer to a no longer valid registration.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
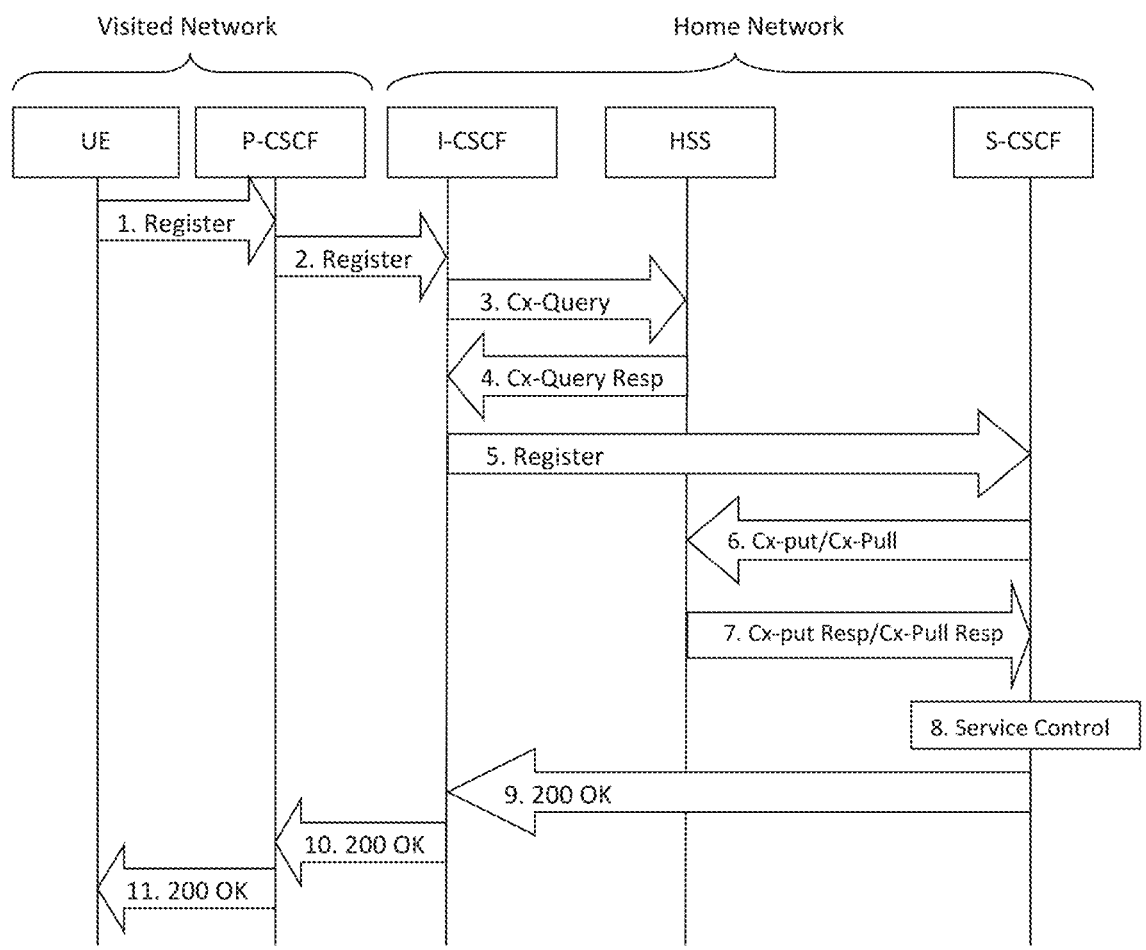
FIG. 1 is an example of an IP Multimedia Subsystem (IMS) network.

In view of the background discussion above, conventional re-registration mechanisms are costly and it is difficult to maintain a contact of UAC valid on the UAS side. Usually, even though it is possible to agree on a longer expiry interval, the need to start timers at the UAC and UAS (in IMS networks more nodes are affected since even application servers can get third party registration and re-registrations), and the need to refresh before the registration expiry timer expires, remains. In some implementations this logic is extremely inefficient, since it requires a lot of resources on many nodes where nothing from the registered contact has changed. Further, the advantage of cleaning up expired registrations is negligible against the amount of signaling crossing the network.

Exemplary embodiments of the present invention give operators or service providers the choice to keep the re-registration mechanism as it is or to choose a more efficient mechanism.

Exemplary embodiments of the present invention ensure backwards compatibility and the possibility to run a software upgrade on existing implementations by adding an extension to the SIP Protocol without breaking former implementations.

Exemplary embodiments of the present invention are generic such that they are applicable wherever the SIP-Protocol is in use (messaging, telephony, business applications, push to talk, etc . . . ).

Exemplary embodiments of the present invention reduce the danger of an overload due to registration storms.

The invention introduces a new way to manage SIP Clients based on the SIP Protocol.

According to one aspect of the invention, there is provided a method for infinity registration using a Session Initiation Protocol (SIP) based communication in a Session Initiation Protocol based network, wherein the network comprises at least two or more SIP user agents and wherein each SIP user agent can act as a user agent client (UAC) when requesting a service function and as a user agent server (UAS) when responding to a request service function.

The method comprises the steps of: initiating a registration, from the UAC to the UAS, wherein the registration comprises a field for indicating infinity registration capability and a field for indicating management communication capability; sending, from the UAS to the UAC, a registration expiry timer with a value equal to infinity and a management header including a onetime unique token; storing, at the UAC, the onetime unique token in combination with the registered UAC; detecting, at the UAS or UAC, whether loss of a connection between the UAS and the UAC has occurred; if a loss of the connection is detected by the UAC, the UAC initiates a new registration without any indication from the UAS; if a loss of the connection is detected by the UAS, sending, by the UAS to the UAC, an SIP message asking the UAC to initiate a new registration; sending, by the UAS to the UAC, the onetime unique token to refer to the no longer valid registration as indicated during the registration.

The invention also provides a Session Initiation Protocol based network comprising at least two or more SIP user agents, wherein each SIP user agent can act as a user agent client (UAC) when requesting a service function and as a user agent server (UAS) when responding to a request service function. The UAC is configured to initiate a registration with the UAS, wherein the registration comprises a field for indicating infinity registration capability and a field for indicating management communication capability. The UAS is configured to send to the UAC, a registration expiry timer with a value equal to infinity and a management header including a onetime unique token. The UAC is configured to store, at the UAC, the onetime unique token in combination with the registered UAC. The UAS and UAC are configured to detect whether loss of a connection between the UAS and the UAC has occurred. If a loss of the connection is detected by the UAC, the UAC is configured to initiate a new registration without any indication from the UAS. If a loss of the connection is detected by the UAS, the UAS is configured to send to the UAC, an SIP message asking the UAC to initiate a new registration. The UAS is configured to send to the UAC, the onetime unique token to refer to the no longer valid registration as announced during the registration.

According to a preferred aspect of the invention, the onetime unique token matches a registration and is sent on a port in which the UAS may contact the UAC, at any time with an SIP message.

According to a preferred aspect of the invention, the expiry timer may be coded as "00".

Other aspects, features, and advantages will be apparent from the present disclosure, including the figures and the claims.

According to a preferred embodiment, the invention provides a method for infinity registration using Session Initiation Protocol (SIP) based communication in an IP Multimedia Subsystem (IMS) network comprising one or more SIP user agents. The method comprises the following steps.

First of all the registration is initiated from the UAC to the UAS. In this registration process, the UAC indicates to the UAS about the capability of infinity registration and/or the capability for management communication.

The re-registration procedure to refresh a contact, between a UAC and a UAS, before a registration expiry timer expires is changed, by the UAS, by sending a registration expiry timer with a value equal to infinity (e.g. can be coded as "00", so that it is not to be confused with "0" that typically means deregister). This may be used when the transport in use for the SIP Signaling is a connection-oriented like Transmission Control Protocol (TCP) or Transport Layer Security (TLS) over TCP. Further, in this scenario it is assumed that the UAC is able to detect if a loss of the connection occurs and does not rely on a periodic polling.

In addition, in the case where the UAC has positively indicated its capability for management communication, the UAS also sends to the UAC, a management header including a onetime token. This onetime unique token is communicated for the first time during the registration.

If a loss of the connection is detected, then a new registration may be performed to the discovered Edge proxys. The Edge proxy(s) is/are the node(s) at the IMS network that communicate with the clients. In other words, the Edge proxy(s) hides all the nodes from the core network so that the client only sees the Edge proxy(s), but nothing else from the network.

There are standardized ways to discover the Edge proxy of a certain network (i.e., via DNS or other protocols, or manually entered by the user).

If the UAC supports the infinite registration, the UAC shall include a Feature-Caps header field with the "+g.3gpp.infinity-reg" contact field parameter, as specified in the standard RFC 6809. This is illustrated in FIG. 2 which depicts an example of a registration flow with infinity registration according to the present invention (simplified to the relevant headers skipping authentication and authorization).

Figure 2:
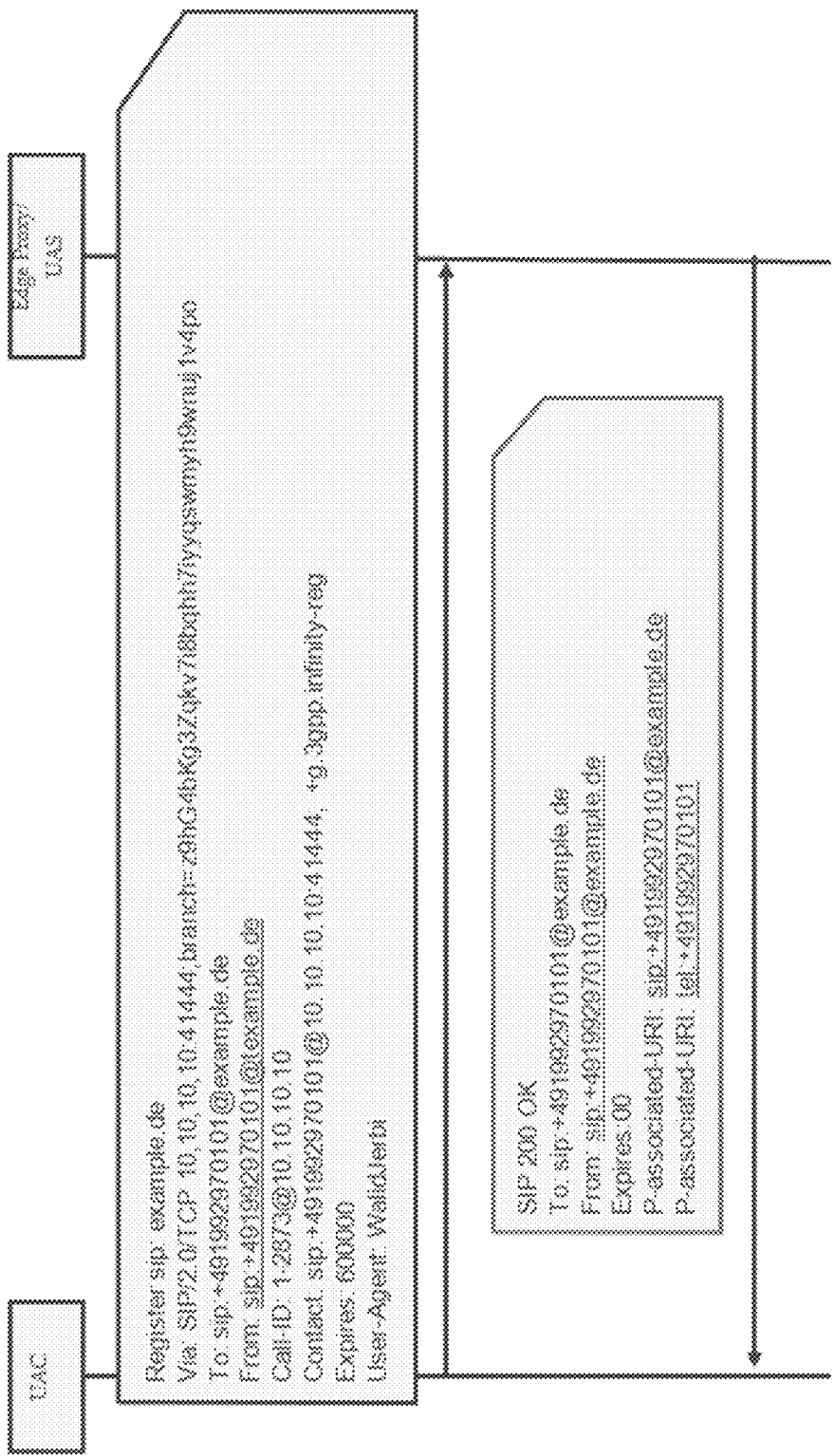
FIG. 2 is an example of a registration flow with infinity registration according to an exemplary embodiment of the present invention.
Figure 3:
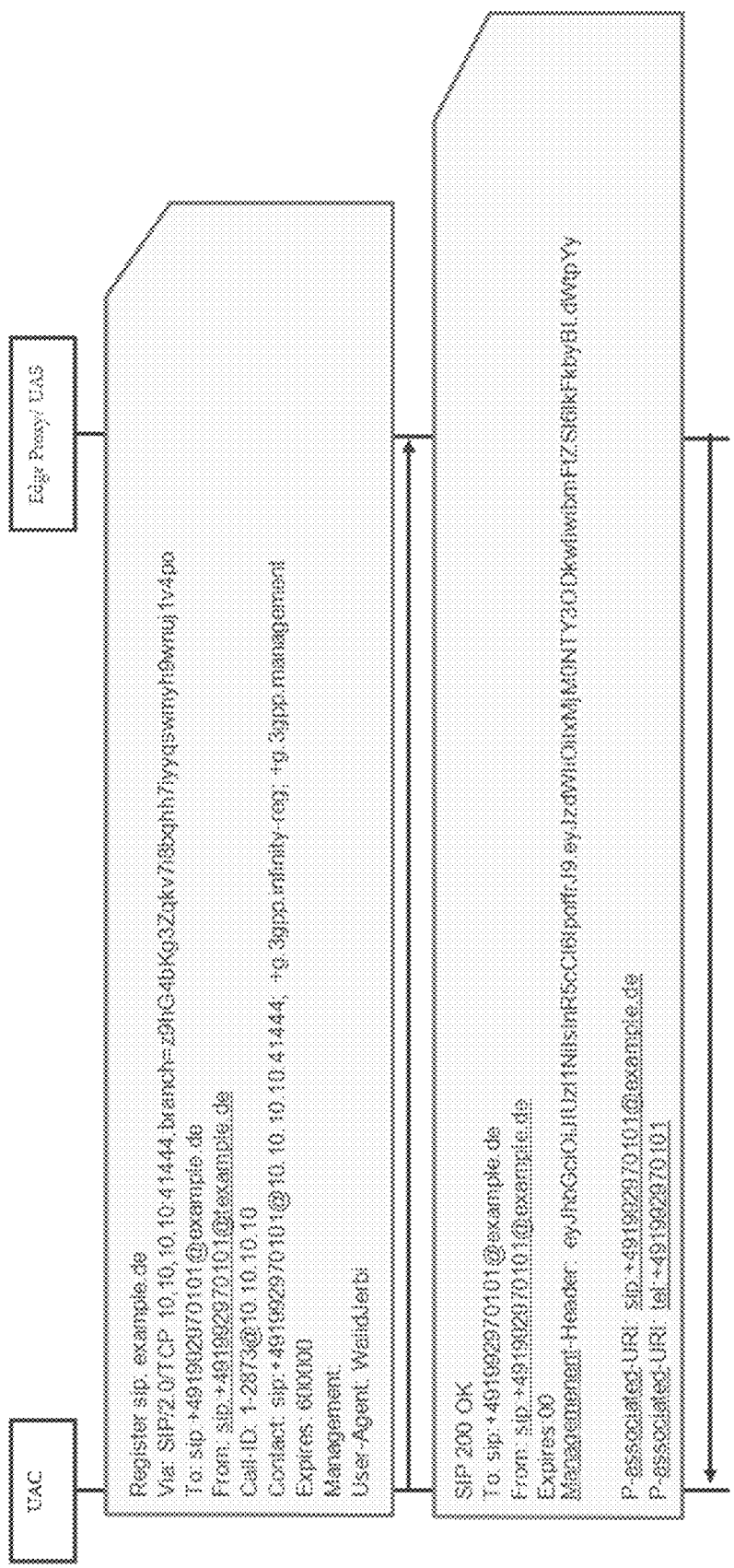
FIG. 3 is an example of a registration flow with infinity registration and management capability according to an exemplary embodiment of the present invention.

Referring to FIG. 2, the UAC notifies the UAS that it supports infinity registration by sending a message which includes a parameter "+g.3gpp.infinity-reg" in the contact field. In this message, the UAC may also notify the UAS that it supports the SIP Management Channel by including the parameter "+g.3gpp.management" in the contact field as shown in FIG. 3.

Thereafter, the UAS changes the re-registration procedure to refresh a contact, by sending a registration expiry timer (see field "Expires" in FIG. 2 or 3) with a value equal to "00"

(infinity). Here, the UAS also includes a management header for indicating with a onetime unique token, which registration it wants to address.

At the UAC, the onetime unique token is stored in combination with the registered UAC contact.

If the UAS detects the loss of connection, then it deregisters the UAC or contact. Normally, it is up to the operator to implement a way to tell the UAC that it will try to reregister again. In some cases, some of these operators have auto-configuration servers—for instance in Fixed Line networks, but not only—that manage UACs and can order a new registration. For such operators the infinity registration as described above is enough, i.e. if these operators manage that these servers react on a trigger from the UAS.

Alternatively, those operators who seek a new option for asking the clients to register with less efforts, the present invention introduces a new option, which involves contacting from the UAS to the SIP Client UAC for instance, to achieve a new registration. For this alternative, the UAC listens on a well-defined port—for example TCP 5060 or TLS-TCP 5061—or another port based on operator policy or based on a new header or a parameter on an existing header sent by the UAC upon registration.

The unique token specifies which registration it wants to address. As mentioned before, the UAS may contact the UAC, at any time on a well-known port (like 5060 or 5061 or a new port to be standardized) or based on operator policy or even based on a new header or as a parameter of an existing header, with an SIP message. Furthermore, the UAS sends the unique token to the UAC to inform the UAC about which registration needs to be restarted (in practice, a UAC may have several running registrations).

A UAS can contact the UAC at any time on this port with an SIP message and ask the UAC to perform a specific action like initiate a new registration. This connection may be secured with TLS, Access-lists on IP level and/or with other mechanisms on Layer 2. If the UAC does not find the unique token sent by the UAS in its database, then it ignores the message and does not execute the action required (i.e. a new registration).

If the UAC supports the SIP Management Channel, the UAC may include a Feature-Caps header field with the "+g.3gpp.management" contact field parameter, as specified in RFC 6809. This management operation process, started by the UAS, is illustrated in FIG. 3 (simplified to the relevant headers).

Figure 4:
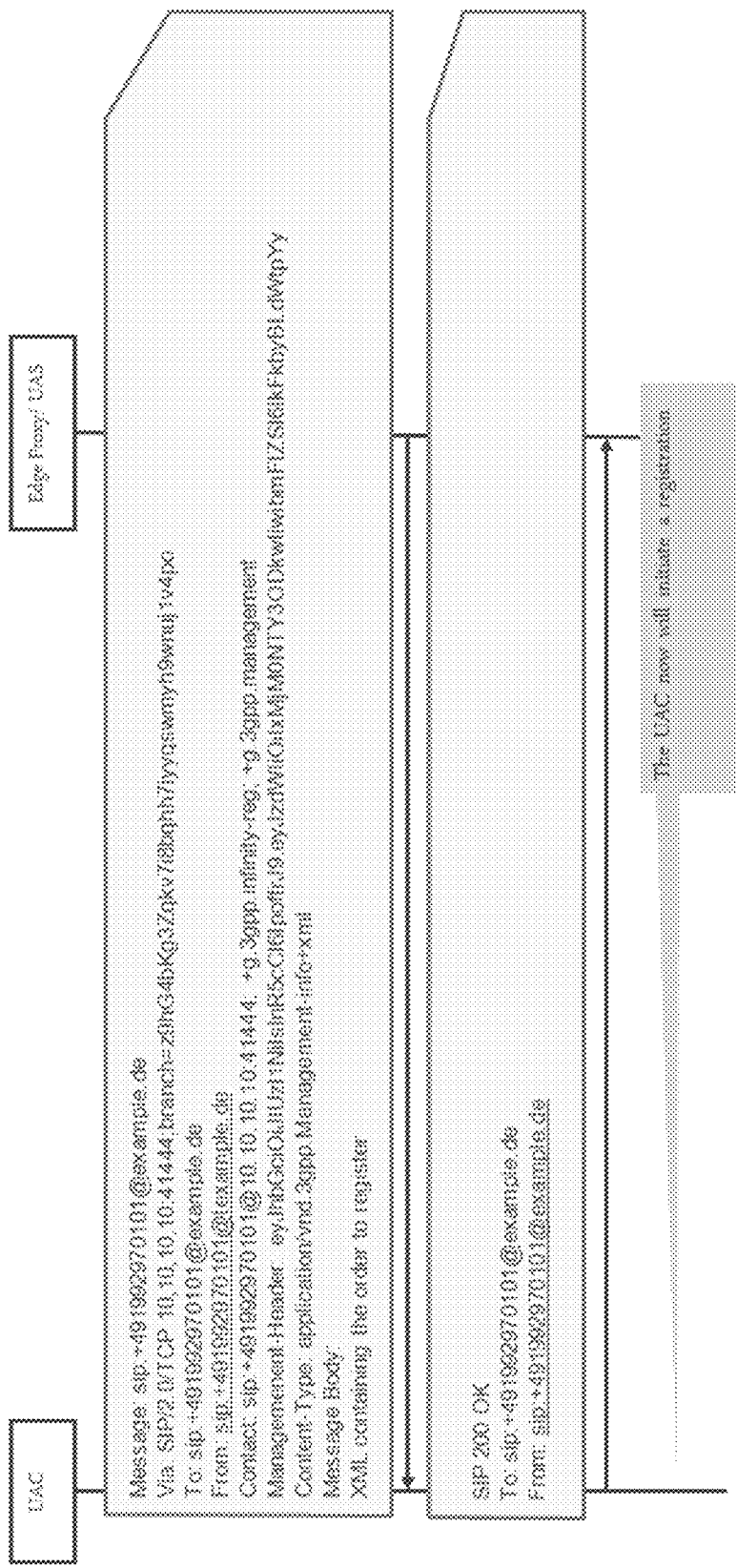
FIG. 4 is an example of a management message according to an exemplary embodiment of the present invention.

Referring to FIG. 4, the UAS contacts and asks the UAC to initiate a new registration. The message includes a management header with the unique token generated as described in FIG. 3.

Every successful registration generates a new valid token (FIG. 3). Then, the UAC is configured to store this token in combination with the registered contact or UAC. The management action is to be correlated with the registered contact. If the UAC does not find a valid token matching the one sent by the UAS, then it ignores the message.

A major benefit of this approach is also that it reduces the danger of registration storms and gives the operator the possibility to address the devices to reregister in a way that no overload can happen.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for infinity registration using Session Initiation Protocol (SIP)-based communication in an SIP-based network, wherein the network comprises at least two or more SIP user agents and wherein each SIP user agent is configured to act as a user agent client (UAC) for requesting a service function and as a user agent server (UAS) for responding to a request service function, the method comprising:
   initiating a registration, from the UAC to the UAS, wherein the registration comprises a field for indicating infinity registration capability and a field for indicating management communication capability;
   sending, from the UAS to the UAC, a registration expiry timer with a value corresponding to at least one of infinity or a management header;
   detecting, at the UAC, whether a loss of a connection between the UAS and the UAC has occurred;
   in response to a loss of the connection being detected by the UAC, initiating, by the UAC, a new registration without any indication from the UAS; and
   sending, by the UAS to the UAC, a onetime unique token to refer to the registration, which is no longer valid, wherein the onetime unique token matches the no longer valid registration and is sent on a port configured to enable the UAS to contact the UAC at any time with an SIP message.

2. The method of claim 1, wherein the registration expiry timer is coded as "00".

3. The method of claim 1, further comprising:
   storing, at the UAC, the onetime unique token in combination with the registered UAC.

4. A method for infinity registration using Session Initiation Protocol (SIP)-based communication in an SIP-based network, wherein the network comprises at least two or more SIP user agents and wherein each SIP user agent is configured to act as a user agent client (UAC) for requesting a service function and as a user agent server (UAS) for responding to a request service function, the method comprising:
   initiating a registration, from the UAC to the UAS, wherein the registration comprises a field for indicating infinity registration capability and a field for indicating management communication capability;

sending, from the UAS to the UAC, a registration expiry timer with a value corresponding to at least one of infinity or a management header;

detecting, at the UAS, whether a loss of a connection between the UAS and the UAC has occurred;

in response to a loss of the connection being detected by the UAS, sending, by the UAS to the UAC, an SIP message asking the UAC to initiate a new registration; and sending, by the UAS to the UAC, a onetime unique token to refer to the registration, which is no longer valid, wherein the onetime unique token matches the no longer valid registration and is sent on a port configured to enable the UAS to contact the UAC at any time with an SIP message.

5. The method of claim 4, wherein the registration expiry timer is coded as "00".

6. The method of claim 4, further comprising:

storing, at the UAC, the onetime unique token in combination with the registered UAC.

7. A Session Initiation Protocol (SIP)-based network comprising:

at least two SIP user agents, wherein each SIP user agent is configured to act as a user agent client (UAC) for requesting a service function and as a user agent server (UAS) for responding to a request service function;

wherein:

the UAC is configured to initiate a registration with the UAS, wherein the registration comprises a field for indicating infinity registration capability and a field for indicating management communication capability;

the UAS is configured to send to the UAC, a registration expiry timer with a value equal to infinity and a management header including a onetime unique token;

the UAC is configured to store, at the UAC, the onetime unique token in combination with the registered UAC;

the UAS and UAC are configured to detect whether loss of a connection between the UAS and the UAC has occurred;

the UAC is configured to initiate, based on a loss of the connection being detected by the UAC, a new registration without any indication from the UAS;

the UAS is configured to send, based on a loss of the connection being detected by the UAS, to the UAC, an SIP message asking the UAC to initiate a new registration; and the UAS is configured to send, to the UAC, the onetime unique token to refer to the registration, which is no longer valid, wherein the onetime unique token matches the no longer valid registration and is sent on a port configured to enable the UAS to contact the UAC at any time with an SIP message.

8. The network of claim 7, wherein the SIP message asking the UAC to initiate a new registration includes a management header for indicating the onetime unique token.

9. The network of claim 7, wherein the registration expiry timer is coded as "00".

\* \* \* \* \*